US012720644B2

(12) United States Patent
Niederer et al.

(10) Patent No.: US 12,720,644 B2
(45) Date of Patent: Aug. 25, 2026

(54) ELECTRIC HEATING DEVICE

(71) Applicant: Eberspächer catem GmbH & Co. KG, Herxheim (DE)

(72) Inventors: Michael Niederer, Kapellen-Drusweiler (DE); Stefan Plewnia, Karlsruhe (DE); Ahmad Asafi, Karlsruhe (DE); Kai-Fabian Burkle, Hinterweidenthal (DE)

(73) Assignee: Eberspacher catem GmbH & Co. KG, Herxheim (DE)

( * ) Notice: Subject to any disclaimer, the term of this patent is extended or adjusted under 35 U.S.C. 154(b) by 576 days.

(21) Appl. No.: 18/229,889

(22) Filed: Aug. 3, 2023

(65) Prior Publication Data

US 2023/0383994 A1 Nov. 30, 2023

Related U.S. Application Data

(62) Division of application No. 16/985,756, filed on Aug. 5, 2020, now Pat. No. 11,856,658.

(51) Int. Cl.

| | |
|---|---|
| ***H05B 3/16*** | (2006.01) |
| ***F24H 9/1818*** | (2022.01) |
| ***H05B 3/04*** | (2006.01) |
| ***H05B 3/06*** | (2006.01) |

(52) U.S. Cl.

CPC ............. *H05B 3/16* (2013.01); *F24H 9/1827* (2013.01); *H05B 3/04* (2013.01); *H05B 3/06* (2013.01); *H05B 2203/02* (2013.01); *H05B 2203/021* (2013.01)

(58) Field of Classification Search

CPC ... H05B 3/16; H05B 3/04; H05B 3/06; H05B 2203/02; H05B 2203/021; H05B 2203/022; H05B 3/24; H05B 3/14; F24H 9/1827

See application file for complete search history.

(56) References Cited

U.S. PATENT DOCUMENTS

| | | | |
|---|---|---|---|
| 11,856,658 B2 * | 12/2023 | Niederer | F24H 9/1827 |
| 12,052,801 B2 * | 7/2024 | Hort | H05B 3/06 |
| 2018/0015805 A1 * | 1/2018 | Gschwind | B60H 1/14 |

* cited by examiner

*Primary Examiner* — Robert G Bachner
(74) *Attorney, Agent, or Firm* — Boyle Fredrickson, SC

(57) ABSTRACT

An electric heating device comprises a housing having a partition wall, which separates a connection chamber from a heating chamber for dissipating heat and from which PTC heating devices protrude as heating ribs in the direction toward the heating chamber. Each PTC heating device comprises at least one PTC element and conductor tracks that are electrically connected in the connection chamber for energizing the PTC element with different polarities and that are connected to the PTC element in an electrically conductive manner. The heating chamber, in a top view onto the partition wall, has a substantially rectangular base area. The PTC heating devices are arranged obliquely relative to the base area for a more compact configuration of the electric heating device.

13 Claims, 3 Drawing Sheets

ELECTRIC HEATING DEVICE

CROSS REFERENCE TO RELATED APPLICATIONS

The present application is a divisional of and claims priority to U.S. patent application Ser. No. 16/985,756, filed Aug. 5, 2020, and entitled "Electric Heating Device", the subject matter of which is incorporated herein by reference in its entirety.

BACKGROUND OF THE INVENTION

1. Field of the Invention

The present invention relates to an electric heating device comprising a housing with a partition wall, which separates a connection chamber from a heating chamber for dissipating heat and from which at least one PTC heating element protrudes as a heating rib in the direction toward the heating chamber, where the PTC heating device comprises at least one PTC element (12) and conductor tracks electrically connected in the connection chamber for energizing the PTC element with different polarities and connected to the latter in an electrically conductive manner. Such an electric heating device is known, for example, from EP 1 872 986 A1 or EP 2 337 425 A1. Another also generic electric heating device is known from EP 3 334 242 A1. In this prior art, the PTC heating element with a heating housing forming the heating rib is first manufactured as a separate component and inserted as such into a heating element receptacle formed on the partition wall, so that the end of the heating housing on the connection side is received in a sealed manner in the heating receptacle of the partition wall and the conductor tracks with their free ends on the connection side are exposed in the connection chamber in order to be electrically connected there.

2. Background of the Invention

In the prior art previously mentioned, the PTC heating device thus preassembled is held in a frictionally engaged manner in the heating receptacle. For this purpose, the PTC heating device has a labyrinth seal that is formed by the heating housing and pressed into the heating receptacle.

According to the teaching of EP 1 872 986 A1 and EP 2 337 425 A1, the PTC heating device is inserted into a receiving pocket of the heating rib and contacted in a thermally conductive manner to the inner surfaces of the receiving pocket. The conductor tracks protrude beyond the receiving pocket in the direction toward the connection chamber and are electrically connected there to the power current for energizing the PTC heating element. In this prior art, the heating rib is formed integrally with the partition wall and protrudes at a right angle to the partition wall.

SUMMARY

Starting out from generic prior art, it is based on the object of specifying an electric heating device of the kind mentioned at the outset having a compact structure.

In this regard, the present invention proposes an electric heating device comprising a housing having a partition wall which separates a connection chamber from a heating chamber for dissipating heat, and PTC heating devices that protrude from the housing as heating ribs in a direction toward the heating chamber. Each PTC heating device comprises at least one PTC element and conductor tracks that electrically connected in the connection chamber for energizing the PTC element with different polarities and that are connected to the PTC element in an electrically conductive manner. The heating chamber has a substantially rectangular base area when viewed from a top view onto the partition wall. Each PTC heating device is arranged in an oblique orientation relative to the base area.

This electric heating device may be an electric heating device for a motor vehicle. The housing is typically a housing that is formed to be suitable for heating a liquid medium and has inlet and outlet ports for this purpose, but otherwise seals the heating chamber. The partition wall typically separates the connection chamber from the heating chamber in a fluid-tight manner. An upper end of each PTC heating device extends through the partition wall. Several PTC heating devices are typically provided and protrude as heating ribs into the heating chamber. The end of each PTC heating device protruding into the connection chamber typically comprises contact strips which are electrically contacted in the connection chamber, for which purpose a contact device may be provided which combines the various PTC heating devices by grouping the contact strips to form heating circuits and is provided with contact strips which in the orientation of the contact strips of the PTC heating devices protrude into a populated printed circuit board. This populated printed circuit board controls the power current for heating each PTC heating device and typically forms a control device.

In a manner known per se and in a top view onto the partition wall, i.e. a line of sight substantially at a right angle to the partition wall, the electric heating device according to the invention has a substantially rectangular base. In this context, substantially means that the base area may well have rounded edges and soft contours which favor the flow conditions within the heating chamber and prevent unnecessary flow resistance.

In the top view presently at issue, however, the base area is approximately rectangular, where bulges or the like can protrude laterally over this base area. The PTC heating devices are arranged in an oblique orientation relative to the rectangular round surface. The PTC heating devices may extend at an angle of 45°+/−15°.

The PTC heating devices, like in prior art, in a cross-sectional view basically have an elongated rectangular shape. Main side surfaces of each PTC heating device disposed opposite to each other abutting against the corresponding main side surfaces of the PTC element in a thermally conductive manner there form the main surfaces of the PTC heating device. These main side surfaces are connected by face surfaces which in a cross-sectional view of the PTC heating device have a relatively small extension in relation to the main side surfaces. The main side surfaces of the PTC heating device are defined by a width. The face surface is defined by a thickness. The longitudinal direction of extension of the PTC heating device runs at a right angle to the planes defined by the width and the thickness. The PTC heating device typically protrudes from the partition wall with this longitudinal direction of extension.

The oblique orientation of the PTC heating devices relative to the base area results in a more compact design of the electric heating device. The PTC heating devices can there have a width which is greater than the width of the rectangular heating chambers, and then even leave a passage free at the face surface through which the fluid to be heated can flow from one flow channel between adjacent PTC heating devices to the next channel between neighboring PTC heating devices.

According to a development of the present invention, the PTC heating devices are aligned in the top view parallel to one another. In a cross-sectional view of the PTC heating devices, flow channel sections with a constant width accordingly arise between the individual PTC heating devices.

With regard to the space-saving accommodation of inlet and outlet openings for the entry of the fluid to be heated into the heating chamber, it is accordingly proposed in a development of the present invention to provide the respective inlet and outlet openings to the heating chamber in diagonally oppositely disposed corners of the base area.

Opposite to a face surface, the housing surrounding the heating chamber may be concave in top view. This concave region defines a flow channel section which is formed between two PTC heating devices. The fluid to be heated is then deflected with little loss at the end of the inflow channel by the concave shape of the outer boundary formed by the housing to arrive at the next flow channel section. It is there assumed that at least one of the PTC heating devices may directly adjoin an edge surface which is formed by the housing and defines the heating chamber. A receptacle, in cross section may have a C-shape, and may protrude from this edge surface and accommodates a face surface of a respective PTC heating device. The outer surface of this C-shaped receptacle, which also forms the walls defining the heating chamber, generally transition continuously and steplesssly to the surface of the PTC heating device, regularly to the main side surfaces thereof. This also reduces the flow resistance within the heating chamber.

A housing lower part of the housing substantially surrounding the heating chamber may be formed from plastic material.

According to an independent aspect of the present invention an electric heating device in a top view does not necessarily, but may, have a rectangular base. The electric heating device specified according to the independent aspect has PTC heating devices which are each plug-connected in a receptacle formed on the partition wall, as is known in principle from EP 3 334 242 A1. The PTC heating devices are at their end disposed opposite to the receptacle supported on a base that is disposed opposite to the partition wall. Plug-connected PTC heating devices provided one behind the other are alternately associated with oppositely disposed edge surfaces of the heating chamber, so that a meandering flow channel is formed in the heating chamber.

Such flow guidance improves the heat dissipation from the PTC heating devices. The medium to be heated is inevitably passed along the main side surfaces of the PTC heating devices and through the respective sections of the flow channel.

Regardless of the specific configuration of the flow channel, the PTC heating devices are in any case may be formed as PTC heating devices which are plug-connected in a receptacle formed by the partition wall. With regard to good positioning in the heating chamber, it is proposed according to a preferred development of the present invention to provide the base of the housing lower part with at least one conically tapering feed guide for every PTC heating device. This feed guide serves to position a free end of the PTC heating device. If the PTC heating devices are first inserted into the receptacles of the partition wall and the housing lower part is then abutted against a housing upper part forming the partition wall in order to complete the heating chamber, then the PTC heating device is positioned by one, usually by several tapering feed guides for every PTC heating device in the context of the joining motion of the housing lower part and the housing upper part.

With regard to reliable flow guidance along the main side surfaces, it is proposed according to a development of the present invention that the base comprises a longitudinal groove which accommodates the free end of at least one of the PTC heating devices. This longitudinal groove not only positions the PTC heating device. It also prevents the fluid to be heated from flowing past the free end of the PTC heating device on the side opposite the partition wall without being sufficiently heated. Because, due to the self-regulating properties of the PTC elements, good heat dissipation is essential for the operation of the PTC heating devices with a good degree of efficiency.

The feed guide can also be provided in the longitudinal groove. The PTC heating devices can in each case have a locking web provided on its underside which engages in the longitudinal groove and interacts with the feed guide for centering the PTC heating device.

BRIEF DESCRIPTION OF THE DRAWINGS

Further details and advantages of the present invention shall become apparent from the following description of an embodiment in combination with the drawing, in which.

DETAILED DESCRIPTION

Figure 1:
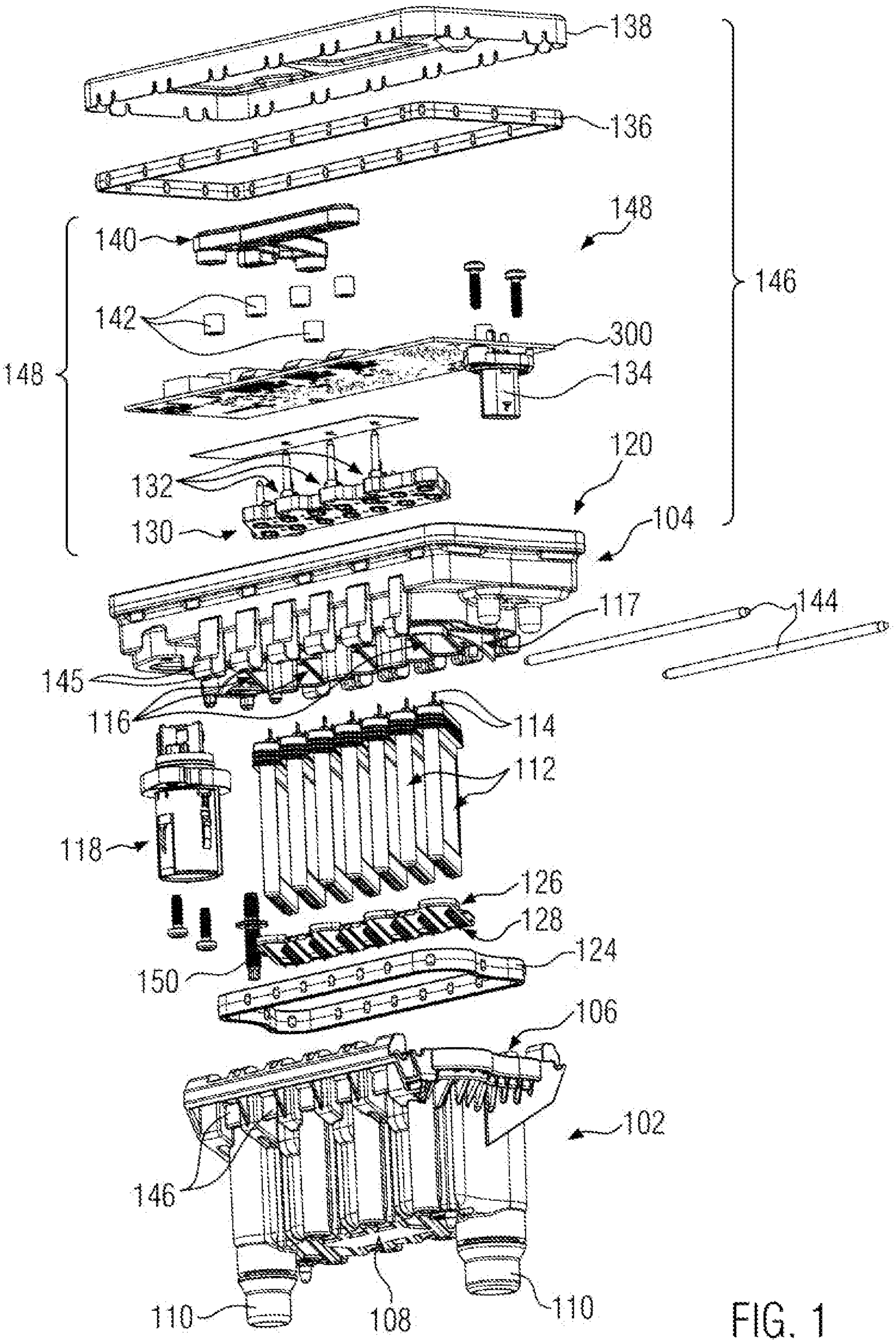
FIG. 1 shows a perspective explosion view of an embodiment of an electric heating device.

FIG. 1 shows an embodiment of an electric heating device 100 with a multi-part housing which comprises a housing lower part 102 made of plastic material and a housing upper part 104 formed integrally from metal by way of die casting.

The housing lower part 102 is trough-shaped and surrounds a heating chamber 106, to which inlet and outlet ports 110 projecting from a base 106 are provided. These inlet and outlet ports 110 are formed integrally with the housing lower part 102 by way of injection molding.

The inlet and outlet ports 110 project beyond the base 108. They extend at a right angle from a planar surface formed by the base 106.

Illustrated between the housing upper part 104 and the housing lower part 102 in the figure is a plurality of PTC heating devices 112 which comprise PTC elements that are provided within the PTC heating devices 112 and contacted by way of conductor tracks in an electrically conductive manner. The conductor tracks are electrically connected by way of contact strips 114. The PTC heating devices 112 are held in a plug-connected manner in receptacles 116 of a partition wall 117 of the housing upper part 104 provided for this purpose. Details of this configuration are described in EP 3 334 242 A1 which originates from the applicant.

Further elements of the heating device 100 are shown between the housing lower part 102 and the housing upper part 104. A high-voltage plug element is denoted by reference numeral 118 and screwed to the housing lower part 104 and comprises contact elements projecting into a connection chamber 120 of the housing upper part 104. These contact elements are electrically connected to a printed circuit board denoted by reference numeral 12 which can be accommodated in the trough-shaped housing upper part 104. Reference numeral 124 denotes a seal which seals the housing lower part 102 against the housing upper part 104 and thus the heating chamber 106.

A holding element 126 provided with elastic projections has the individual PTC heating devices 112, each of which has individually accommodating heating device receptacles 128 which claw into the outer circumferential surface of the individual PTC heating devices 112. In the assembled state, the holding element 126 is also connected to the housing lower part 104 in a positive-fit and/or force-fit manner.

A contact device 130 is arranged above the housing upper part 104 and below the printed circuit board 122 and electrically connects all the contact strips 114 and groups individual PTC heating devices 112 to form heating circuits. An electrical connection between the contact device 130 and the printed circuit board 122 is established by contact strips 132 projecting from the contact device 130. Connected to the circuit board 142 and protruding therefrom is a control signal plug element illustrated by reference numeral 134. This control signal plug element 134 is screwed against the printed circuit board 122.

A further circumferential seal 136 and a control housing cover 138 with which the connection chamber 120 of the housing upper part 104 is covered and sealed are shown above the printed circuit board 122. The control housing cover 138 is made of metal in order to shield together with the housing upper part 104 against electromagnetic radiation which arises from the switching of the power current within the control housing 104, 136, 138. A support frame 140 is arranged between the control housing cover 138 and the printed circuit board 122 and supports compression elements 142 between itself and the printed circuit board 122 in order to, for example, press power transistors mounted on the printed circuit board 122 against cooling surfaces which are connected in a thermally conductive manner to cooling domes extended into the heating chamber 106. The cooling surfaces are connected to the power transistors in a thermally conductive manner.

After assembly, connecting rods 144 engage behind locking projections 145 which are provided on the housing lower part 102 and the housing upper part 104 in order to connect the two parts 102, 104 captively and in a positive-fit manner to one another. Details on this are described in EP 2 796 804 A1.

The control housing cover 138 together with the housing upper part 104 and the seal 136 forms a control housing 146. Due to their metallic materials, the control housing cover 138 and the housing upper part 104 form a shielding around the control device 148 which is accommodated in this control housing 146 and is substantially formed by the printed circuit board 122. A connection pin 150 protrudes from the control housing 146 in the direction of the plug elements 118, 134. This connection pin 150 is used to connect the metallic control housing 146 to a ground phase and is screwed to the control housing 146.

Figure 2:
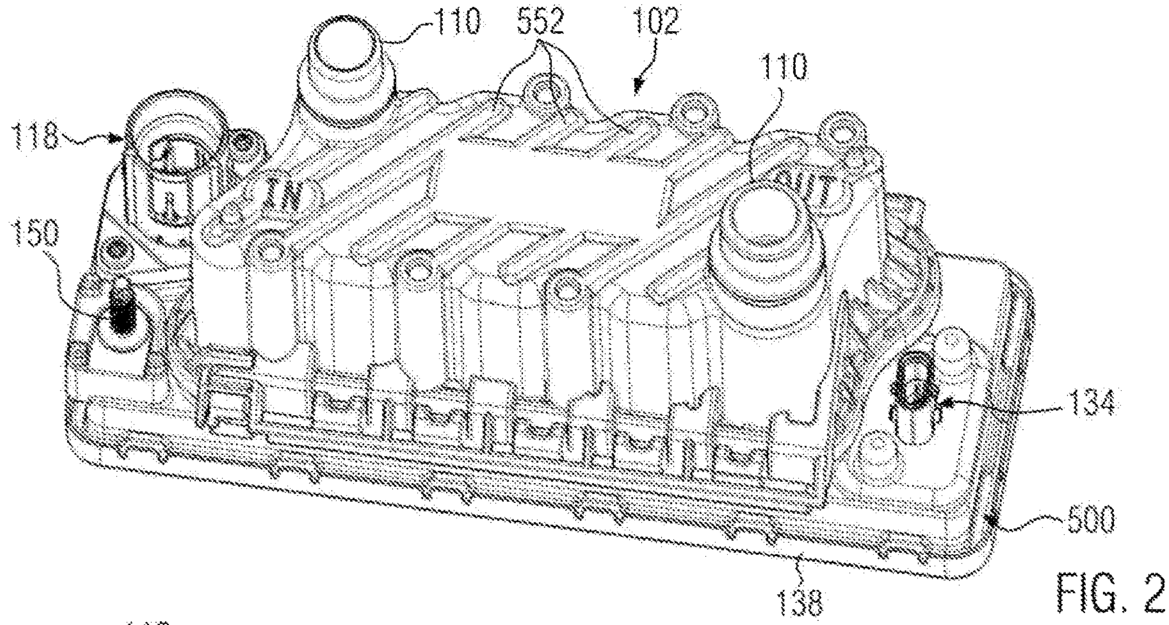
FIG. 2 shows a perspective lower view of the embodiment.

In FIGS. 2-7, the PTC heating device denoted by reference numeral 112 in FIG. 1 is denoted by reference numeral 600; the housing lower part denoted by reference numeral 550 in FIG. 1 is denoted by reference numeral 550 in FIGS. 2 et. seqq. The PTC heating device 600 has respective oppositely disposed main side surfaces 602 which respectively define flow channel sections 552 of a flow channel S within the heating device 100 in which the liquid medium to be heated is guided. The main side surfaces 602 define the width b of the PTC heating device 600. The PTC heating devices 600 are each abutted against oppositely disposed edge surfaces 554 of the housing lower part 550. The housing lower part 550 there forms a receptacle 556 which in cross section is C-shaped according to FIG. 5 and which accommodates a face surface 606 of the PTC heating device 600. The face surface 606 connects the main side surfaces marked with reference numeral 602 for heat dissipation. The face surface 606 of the PTC heating element 600 abuts against the edge surface 554. Each first PTC heating element 600 in FIG. 5 abuts against the upper edge surface 554, and each second PTC heating element 600 abuts against the lower edge surface 554 of the housing lower part 550.

Disposed oppositely to the face surface 606 opposite thereto is a cooling dome 512 which is connected in a thermally conductive manner to a power transistor 308. For this purpose, one of the power transistors 308 respectively abuts against a cooling surface 510 which is exposed in the connection chamber 120 and which forms the end of the cooling dome 512 on the connection side. An inner surface 516 of the cooling dome 512 covers the corresponding face surface 606 of the PTC heating device 600 in a roof-shaped manner. It serves to deflect the flow of the fluid flow guided in the flow channel section 552 from one flow channel section 552 to the next flow channel section 552.

Figure 5:
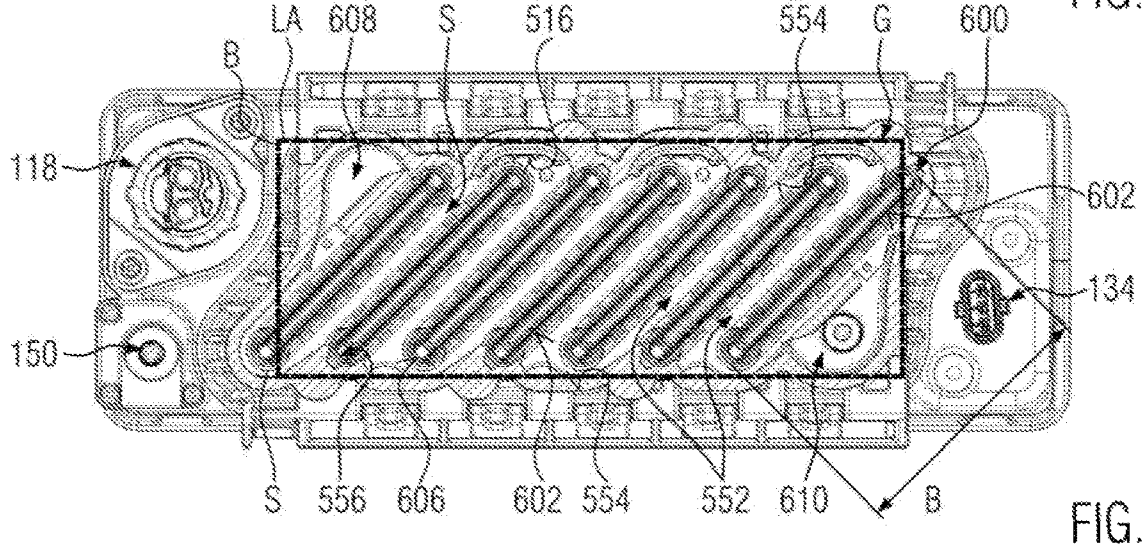
FIG. 5 shows a sectional view along line V-V according to the representation in FIG. 4.

The design of the PTC heating devices 600 illustrated in FIG. 5 and its arrangement relative to the edge surfaces 554 of the housing lower part 550 results in a meandering flow channel S through the heating chamber 106. This flow channel S guides the fluid in Figure from a widened inlet 608 (top left) to a widened outlet 610 (bottom right). The medium to be heated passes over each of all the main side surfaces 602. In FIG. 5, the tip of a temperature sensor that is denoted by reference numeral and that measures the outlet temperature of the fluid to be heated and subsequently controls the heating power accordingly 400 can be seen in the region of the outlet 610.

FIG. 5 shows further details of the housing lower part 550. The C-shaped receptacle 556 is shaped such that a slot 558 extending in the longitudinal direction L of the PTC heating device is formed between the face surface 606 and the surface of the C-shaped receptacle opposite thereto. The slot serves to compensate for tolerances since the PTC heating device 600 can be subject to dimensional and shape-related fluctuations on its face surface for production reasons, but on the other hand is to be accommodated in the receptacle 556 as fluid-tight as possible. The slot 558 also allows for a certain spreading of the C-shaped receptacle 556, so that the two legs of the C-shaped receptacle 584 can abut against the PTC heating device 600 from the outside.

In the embodiment shown, the housing lower part 550 is made of plastic material.

As is further evident from FIG. 5, the heating chamber 106 in the top view shown has a substantially rectangular cross section. For this purpose, the PTC heating devices 600 are oriented obliquely, so that the width of the heating chamber 106 (in the vertical direction of FIG. 5) is less than the width of the PTC heating devices 600. The PTC heating devices are set obliquely by approximately 30 to 50°. This results in a more compact structure of the electric heating device. However, the PTC heating devices 600 are aligned at the same width parallel to each other to form flow channel sections 552 running parallel to each other. Located in the corners of a basically rectangular base area G shown in dot-dashed lines in FIG. 5 are inlets and outlets 608, 610. The base area G has a width B and a length LA. FIG. 5 further illustrates the PTC heating devices 600 oriented in a row that extends in-line with the rectangular base area G. That is, the row of PTC heating devices 600 extends in a horizontal plane oriented parallel to the length LA of the base area G.

The PTC heating devices 600 are plug-connected in the receptacles 116. The PTC heating devices 600 with their contact strips 114 project into the connection chamber 106 and are there electrically connected to the contact device 130 which combines the various PTC heating devices 600 and their contact strips 114 to form heating circuits. The contact device 130 is in turn electrically connected to the printed circuit board 122 which forms the control device 148 of the embodiment.

Figure 3:
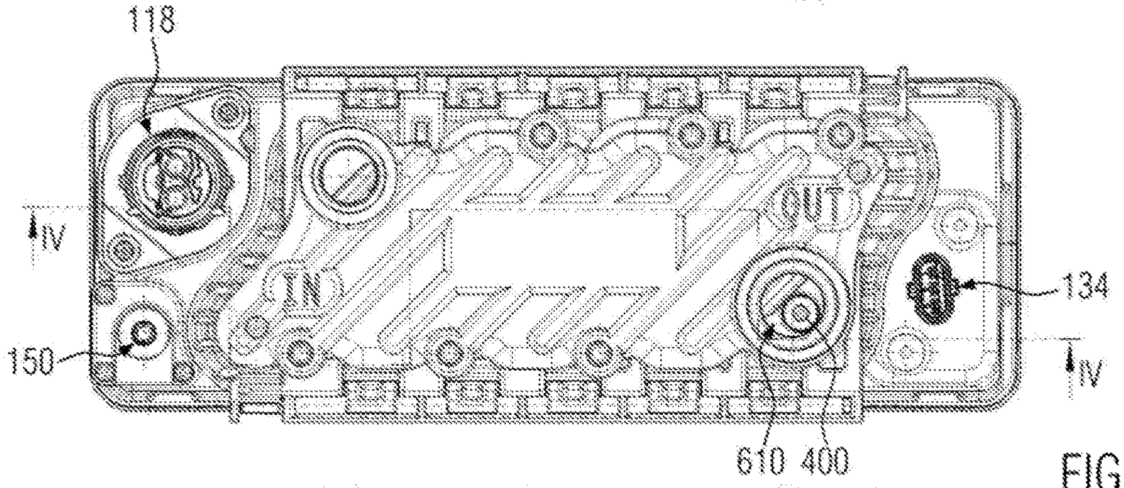
FIG. 3 shows a lower view of the embodiment.
Figure 4:
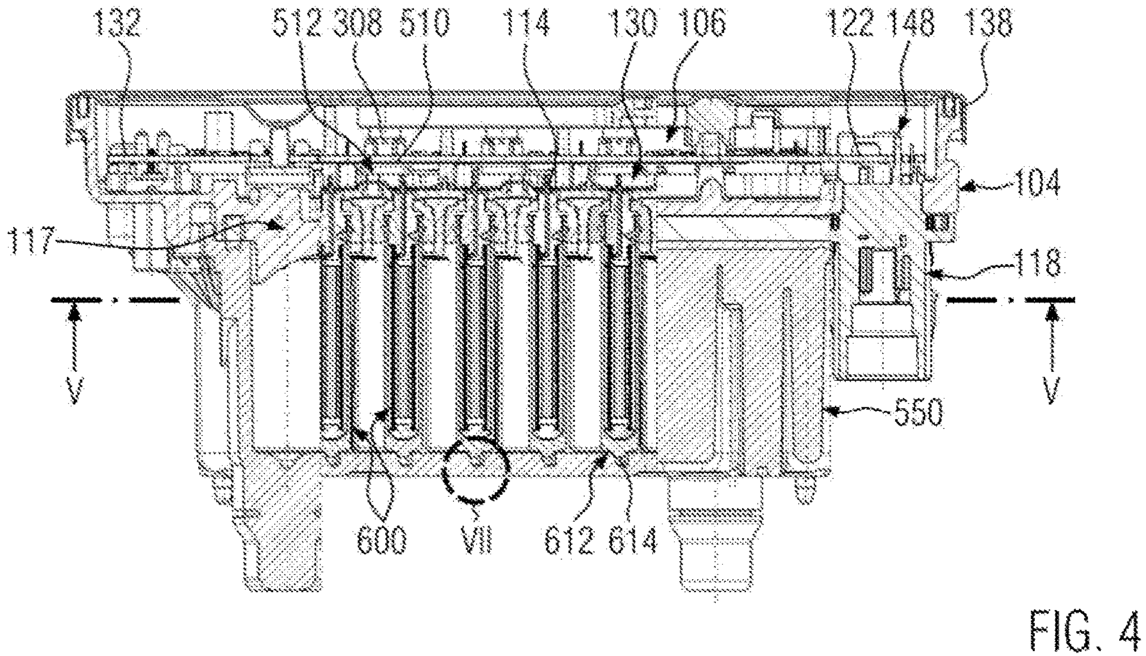
FIG. 4 shows a sectional view along line IV-IV according to the representation in FIG. 3.
Figure 6:
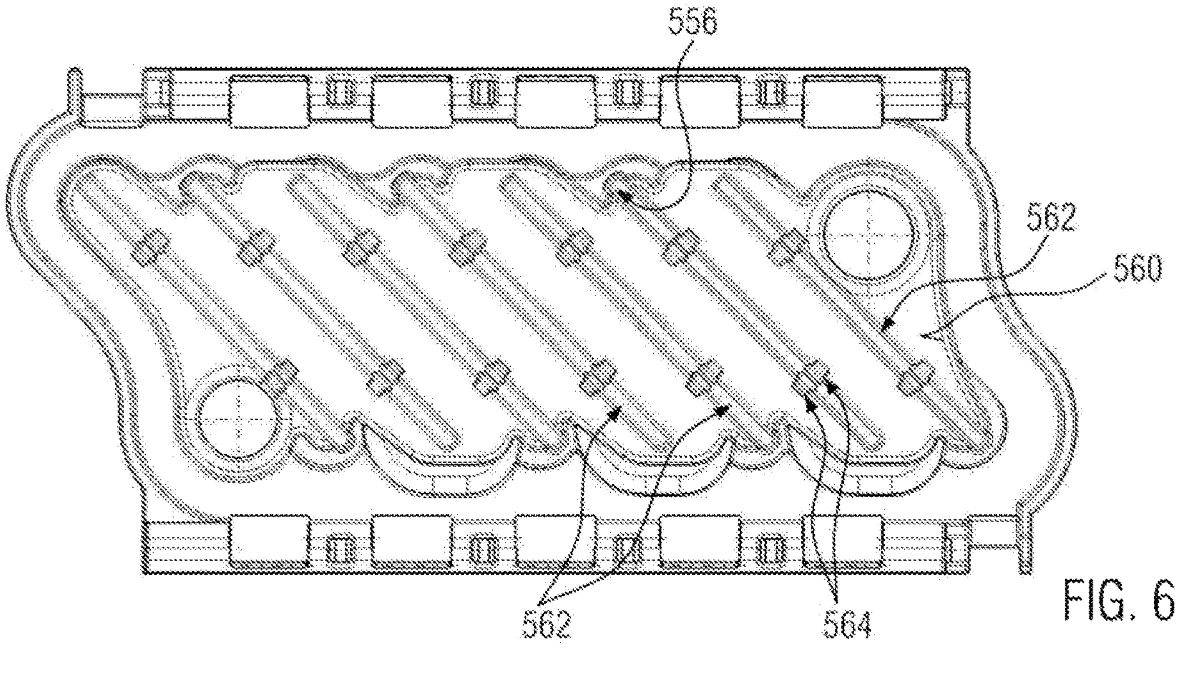
FIG. 6 shows a top view onto the base of the embodiment without the PTC heating devices.
Figure 7:
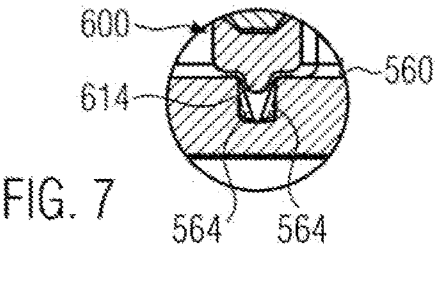
FIG. 7 shows detail according to FIG. 4 in an enlarged view.

The housing lower part 550 has a base 560 in which a longitudinal groove is recessed which is denoted in FIGS. 6 and 7 by reference numeral 562. The negative shape of the respective longitudinal groove 562 can be seen in FIG. 3 and is denoted there by reference numeral 563. This negative shape 563 also in FIGS. 3 and 4 shows the implementation of the longitudinal grooves 562 on the base 560. A lower free end of the PTC heating device 600 denoted by reference numeral 612 is provided with a locking web 614 which projects in the longitudinal direction L at the bottom from the PTC heating device 600. This locking web 614 engages in the longitudinal groove 562, whereby the flow channel S at the lower end of the PTC heating device 600 is substantially sealed (see FIG. 4).

Disposed in the region of the ends of the longitudinal groove 562 on both sides of the longitudinal groove 562 are feed guides 564 which taper conically in the direction of the base of the longitudinal groove 562 and are arranged in the longitudinal groove 562.

FIG. 5 also shows the fluidically favorable configuration of the heating chamber 106. It avoids rectangular flow cross sections or edged transitions, respectively. Disposed opposite to the cooling domes 512, the edge surfaces of the housing lower part 550 are shaped concave, so that the flow at the free end surfaces 606 of the PTC heating devices 600 is respectively transferred from one flow channel 552 to the next at low losses. All deflection points in the upper part of the heating chamber 106 in FIG. 5 are each formed by a cooling dome 512.

When the embodiment shown is assembled, the PTC heating devices 600 are each inserted into receptacles 116 associated with them which are recessed in the partition wall 117. A fluid-tight seal of the PTC heating device in this receptacle 116 arises due to a sealing collar formed on the housing of the PTC heating device 600. Only the contact strips 114 project into the connection chamber 120 and are electrically connected there. The frictionally engaged reception of the PTC heating devices 600 in the receptacle 116 is certainly sufficient during assembly and handling in order to hold the PTC heating devices 600 on the housing upper part 104.

The housing lower part 550 is then mounted. For this purpose, the housing lower part 550 is advanced in the direction toward the housing upper part 104. When approaching the housing lower part 550 and the housing upper part 104 to the final position of the assembled heating device, the locking web 614 is received between the feed guides 564 and is aligned and centered parallel to the longitudinal groove 562 during a further infeed motion due to the conical configuration of the feed guides 564. At the end of the infeed motion, the locking web 614 is received in the longitudinal groove 562.

The PTC heating devices 600 have a width b, the dimension of which is greater than the width B of the base area G. The PTC heating devices 600 are each aligned obliquely at an angle of approximately 45° to the boundary lines of the base area G. Effective PTC heating devices 600 with a relatively large heat-dissipating surface can then be accommodated in a relatively small housing 102; 104, 550. The oblique positioning also allows for a slightly parallelogram-like distortion of the base area G, so that the plug elements 118, 134 can be provided laterally beside the area occupied by the heating chamber 106 in the top view according to FIG. 5 for contacting the power current or the control current. The embodiment then has a compact structure.

We claim:

1. An electric heating device comprising:

a housing having a partition wall which separates a connection chamber from a heating chamber for dissipating heat;

PTC heating devices that protrude from the partition wall of the housing as heating ribs in a direction toward the heating chamber, wherein each PTC heating device comprises at least one PTC element and conductor tracks that are electrically connected in the connection chamber for energizing the PTC element with different polarities and that are connected to the PTC element in an electrically conductive manner;

wherein the PTC heating devices are plug-connected in receptacles formed on the partition wall and are supported with oppositely disposed ends thereof on a base of the heating chamber, the base being disposed opposite to the partition wall;

wherein alternately oppositely disposed edge surfaces of the heating chamber are associated with plug-connected PTC heating devices that are provided one behind the other so that a meandering flow channel is formed in the heating chamber;

wherein a face surface of each PTC heating device is received by a respective receptacle, which is C-shaped in cross section and protrudes from an edge surface of the housing; and wherein the face surface of the PTC heating device connects mutually oppositely disposed main side surfaces of the PTC heating device to one another.

2. The electric heating device according to claim 1, wherein the heating chamber has a substantially rectangular base area when viewed in a top view onto the partition wall, and wherein at least one of the PTC heating devices is arranged in an oblique orientation relative to the base area.

3. The electric heating device of claim 2, wherein at least one of the PTC heating devices is arranged in an oblique orientation relative to the base area at an angle of between 30° and 50°.

4. The electric heating device according to claim 2, wherein at least one of the PTC heating devices includes a plurality of PTC heating devices arranged in a row extending in-line with the base area.

5. The electric heating device according to claim 1, wherein a width of at least one of the PTC heating devices is greater than a width of the heating chamber.

6. The electric heating device according to claim 1, wherein at least two of the PTC heating devices are aligned parallel to one another when viewed from a top view.

7. The electric heating device according to claim 1, wherein inlet and outlet openings, communicating with the heating chamber, are arranged in diagonally oppositely disposed corners of the base area.

8. The electric heating device according to claim 1, wherein a housing lower part of the housing is formed concave in order to define an outer boundary of a flow channel flowing around the PTC heating devices on the face surfaces.

9. The electric heating device according to claim 1, wherein a base of a housing lower part of the housing comprises at least one conically tapering feed guide for positioning a free end of at least one of the PTC heating devices.

10. The electric heating device according to claim 9, wherein the base of the housing lower part of the housing comprises a longitudinal groove accommodating a free end of at least one of the PTC heating devices.

11. The electric heating device according to claim 10, wherein the feed guide is provided in the longitudinal groove.

12. The electric heating device according to claim 10, wherein a locking web is received within the longitudinal groove.

13. The electric eating device according to claim 1, wherein a face surface of at least one of the PTC heating devices opposite the face received by the receptacle is covered by a cooling dome.

* * * * *